United States Patent
Okuda et al.

(10) Patent No.: US 9,921,983 B2
(45) Date of Patent: Mar. 20, 2018

(54) DIRECT MEMORY ACCESS CONTROLLER, CONTROL METHOD THEREOF, AND INFORMATION PROCESSING SYSTEM

(71) Applicant: SOCIONEXT INC., Yokohama-shi, Kanagawa (JP)

(72) Inventors: Takashi Okuda, Yokohama (JP); Satoru Okamoto, Kawasaki (JP)

(73) Assignee: SOCIONEXT INC., Yokohama (JP)

( * ) Notice: Subject to any disclaimer, the term of this patent is extended or adjusted under 35 U.S.C. 154(b) by 387 days.

(21) Appl. No.: 14/469,981

(22) Filed: Aug. 27, 2014

(65) Prior Publication Data

US 2015/0120983 A1    Apr. 30, 2015

(30) Foreign Application Priority Data

Oct. 29, 2013 (JP) .................................. 2013-224637

(51) Int. Cl.
*G06F 13/28* (2006.01)
*G06F 13/30* (2006.01)

(52) U.S. Cl.
CPC .............. *G06F 13/30* (2013.01); *G06F 13/28* (2013.01); *Y02B 60/1228* (2013.01)

(58) Field of Classification Search
CPC .......... G06F 13/28; G06F 11/00; G06F 13/30; G06F 21/70; Y02B 60/1228
See application file for complete search history.

(56) References Cited

U.S. PATENT DOCUMENTS

| | | | | |
|---|---|---|---|---|
| 4,371,932 A | * | 2/1983 | Dinwiddie, Jr. | ....... G06F 13/282 710/21 |
| 5,551,009 A | * | 8/1996 | Amini | ..................... G06F 5/065 370/428 |
| 5,864,712 A | * | 1/1999 | Carmichael | ............. G06F 13/28 710/20 |
| 5,948,080 A | | 9/1999 | Baker | |
| 5,983,301 A | | 11/1999 | Baker et al. | |
| 6,006,286 A | | 12/1999 | Baker et al. | |
| 6,081,852 A | | 6/2000 | Baker | |

(Continued)

FOREIGN PATENT DOCUMENTS

| CN | 101558396 A | 10/2009 |
|---|---|---|
| JP | 62-50946 A | 3/1987 |

(Continued)

OTHER PUBLICATIONS

Chinese Office Action of related Chinese Patent Application No. 201410478629.7 dated Mar. 2, 2017.

(Continued)

*Primary Examiner* — Steven Snyder
*Assistant Examiner* — Christopher A Daley
(74) *Attorney, Agent, or Firm* — Arent Fox LLP

(57) ABSTRACT

Two channels of a main CPU channel and a sub CPU channel each including a reception channel and a transmission channel, and performing a data transfer by a DMA in accordance with a descriptor are provided, a channel switching part selects the main CPU channel or the sub CPU channel in accordance with information set at a mode setting register, and performs a switching of channels at a boundary of a packet to be transferred to thereby enable the switching of channels without interrupting a DMA operation.

7 Claims, 14 Drawing Sheets

(56) References Cited

U.S. PATENT DOCUMENTS

| | | | |
|---|---|---|---|
| 6,154,793 A * | 11/2000 | MacKenna | G06F 13/28 710/10 |
| 6,333,938 B1 | 12/2001 | Baker | |
| 6,868,458 B2 | 3/2005 | Kim | |
| 8,032,793 B2 * | 10/2011 | Haneda | G06F 11/0745 710/301 |
| 8,773,996 B2 * | 7/2014 | English | H04L 12/6418 370/235 |
| 9,141,572 B2 * | 9/2015 | Triece | G06F 13/285 |
| 2003/0177291 A1 | 9/2003 | Hori et al. | |
| 2003/0187818 A1 * | 10/2003 | McCarty | G06F 9/44505 |
| 2008/0148083 A1 | 6/2008 | Pesavento et al. | |
| 2008/0250275 A1 * | 10/2008 | Walker | G06F 11/3476 714/45 |
| 2009/0219913 A1 * | 9/2009 | Nakamura | H04B 7/2656 370/345 |
| 2013/0067176 A1 | 3/2013 | Sugasawa et al. | |
| 2013/0311699 A1 * | 11/2013 | Birsan | G06F 13/28 711/103 |
| 2014/0259149 A1 * | 9/2014 | Circello | G06F 21/74 726/16 |
| 2015/0106579 A1 * | 4/2015 | Barrus | G06F 12/0223 711/159 |
| 2016/0011998 A1 | 1/2016 | Triece et al. | |

FOREIGN PATENT DOCUMENTS

| | | |
|---|---|---|
| JP | 2-96261 A | 4/1990 |
| JP | 10-40211 A | 2/1998 |
| JP | 2000-181856 A | 6/2000 |
| JP | 2002-351824 A | 12/2002 |
| JP | 2003-271542 A | 9/2003 |
| JP | 2005-153186 A | 6/2005 |
| JP | 2005-258509 A | 9/2005 |
| JP | 2006-195821 A | 7/2006 |
| JP | 2010-74256 A | 4/2010 |
| JP | 2011-248407 A | 12/2011 |
| JP | 2013-61857 A | 4/2013 |

OTHER PUBLICATIONS

Japanese Office Action of related Japanese Patent Application No. 2013-224637 dated Apr. 11, 2017.

Chinese Office Action of related Chinese Patent Application No. 201410478629.7 dated Aug. 29, 2017.

* cited by examiner

F I G. 1
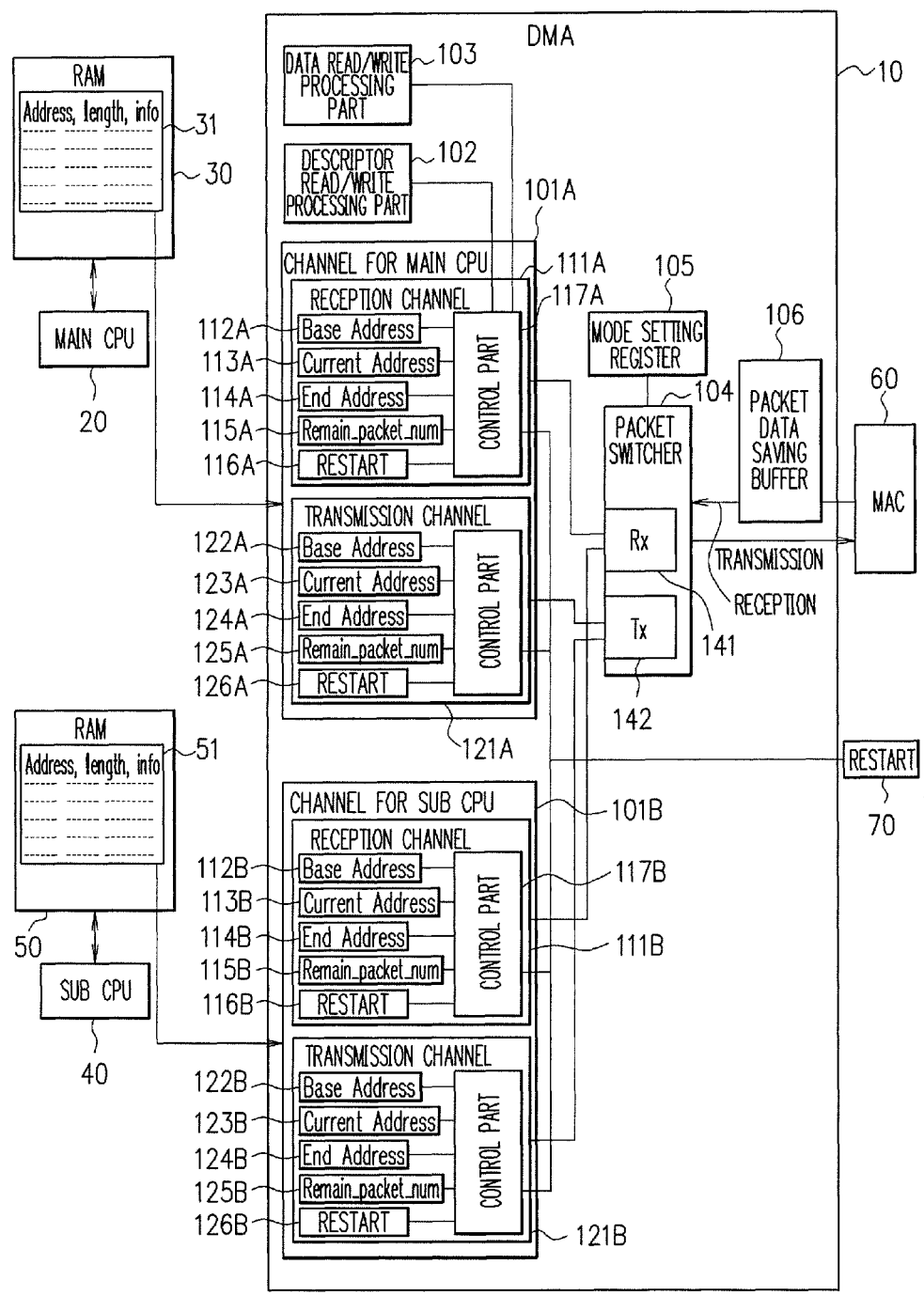

F I G. 2A
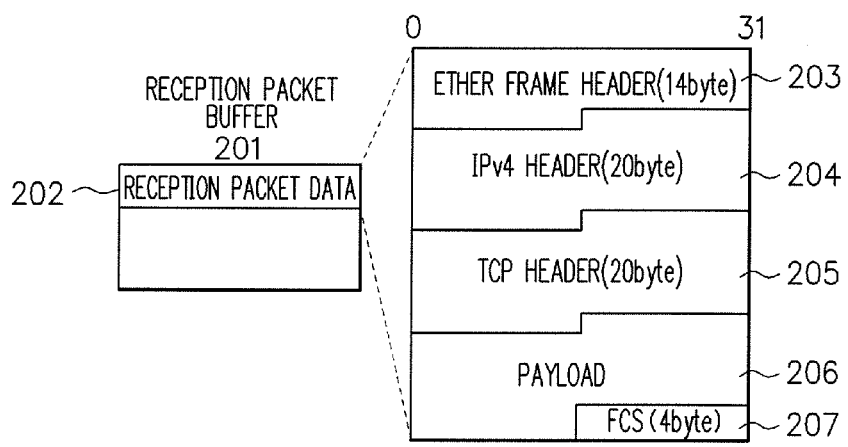
F I G. 2B
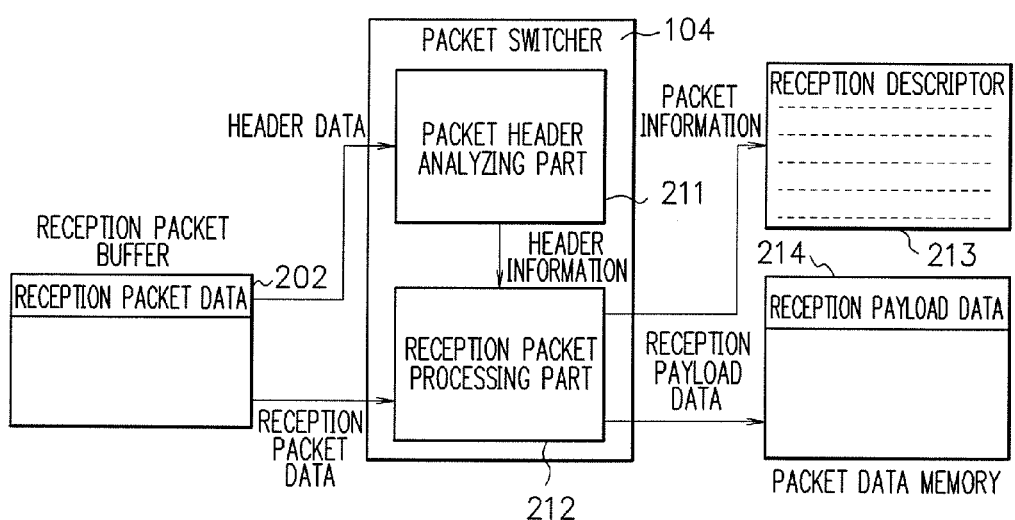

F I G. 5
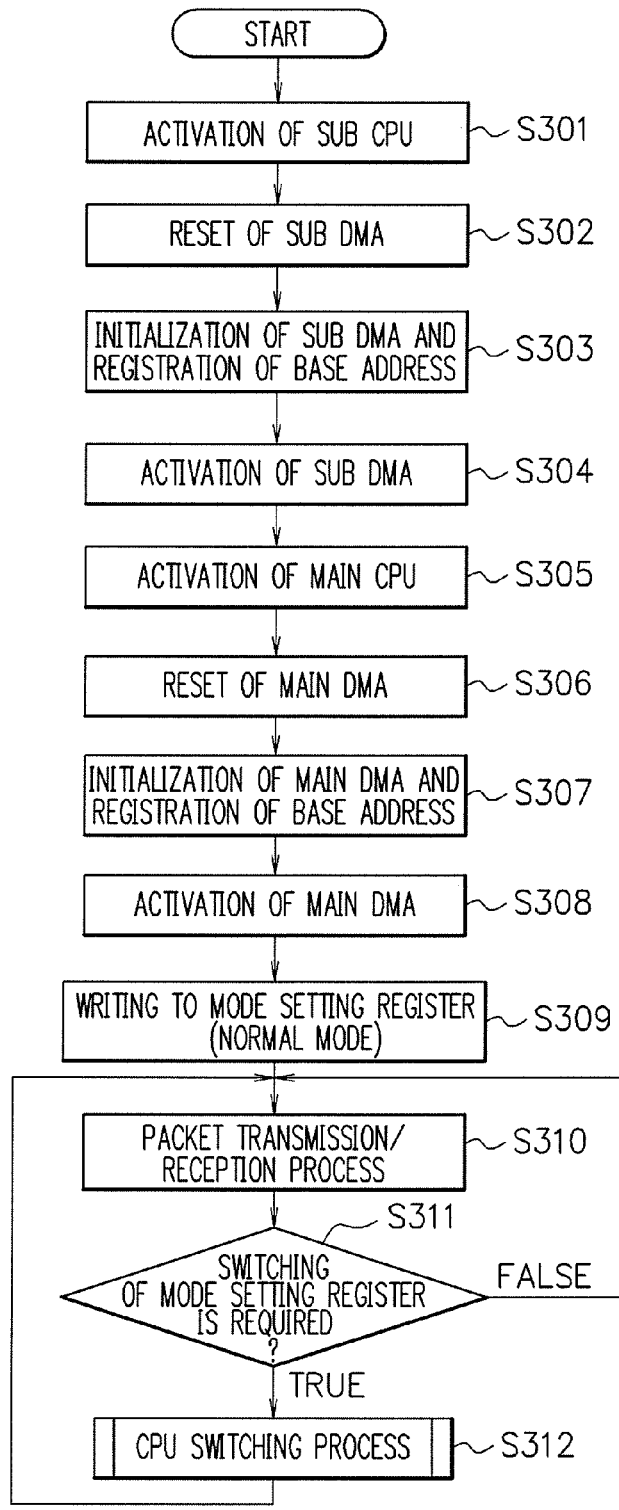

F I G. 7
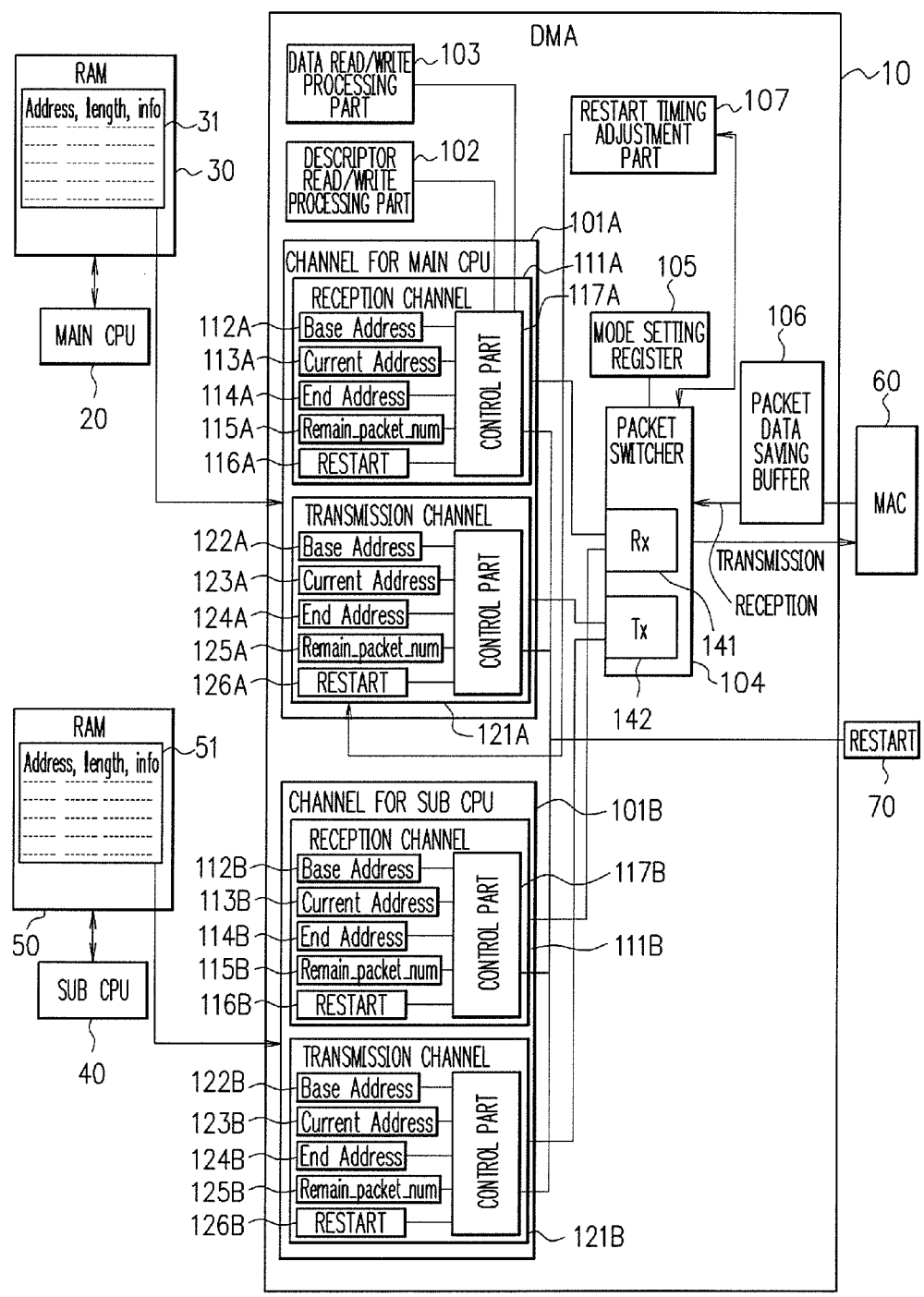

F I G. 12
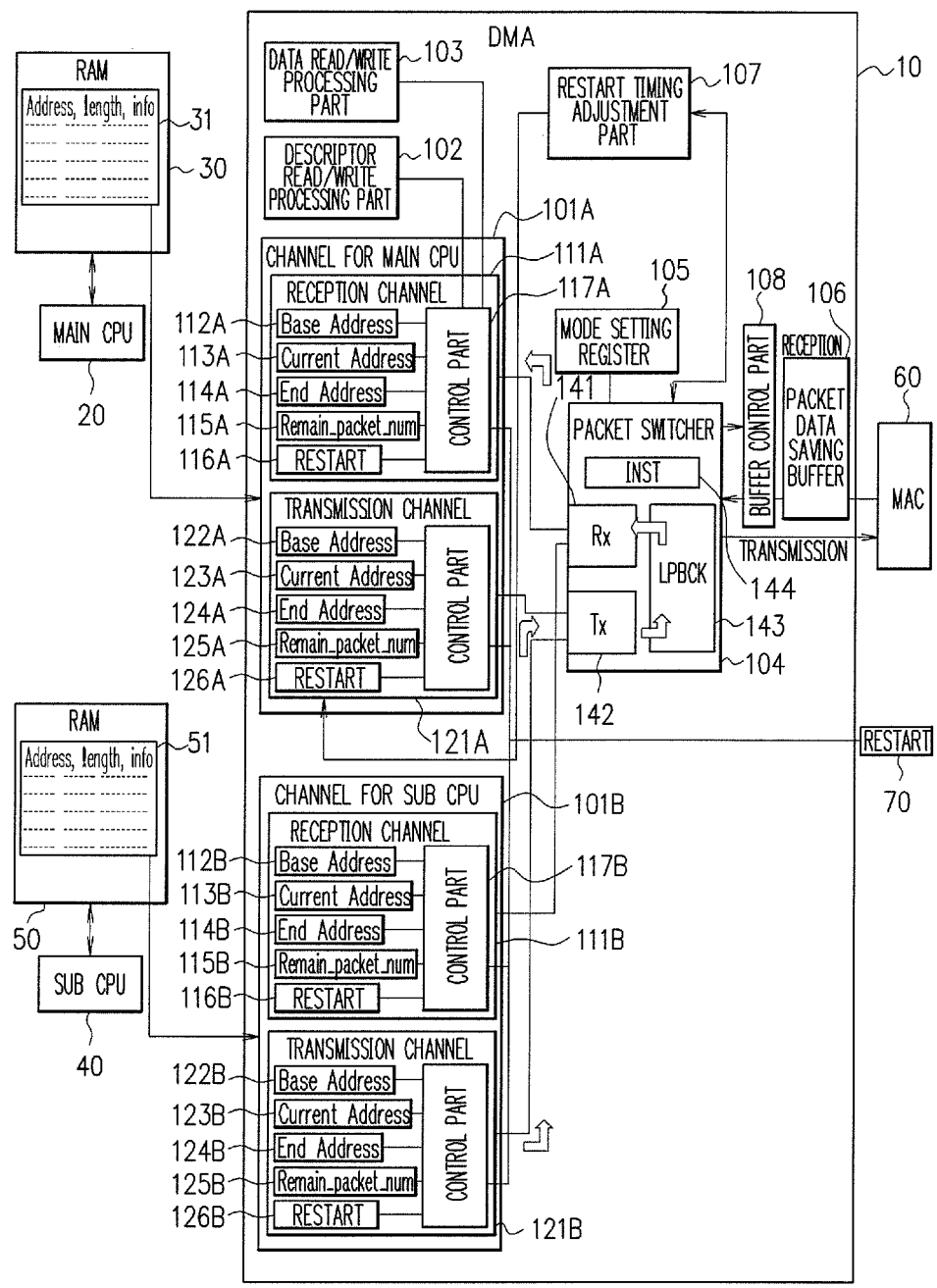

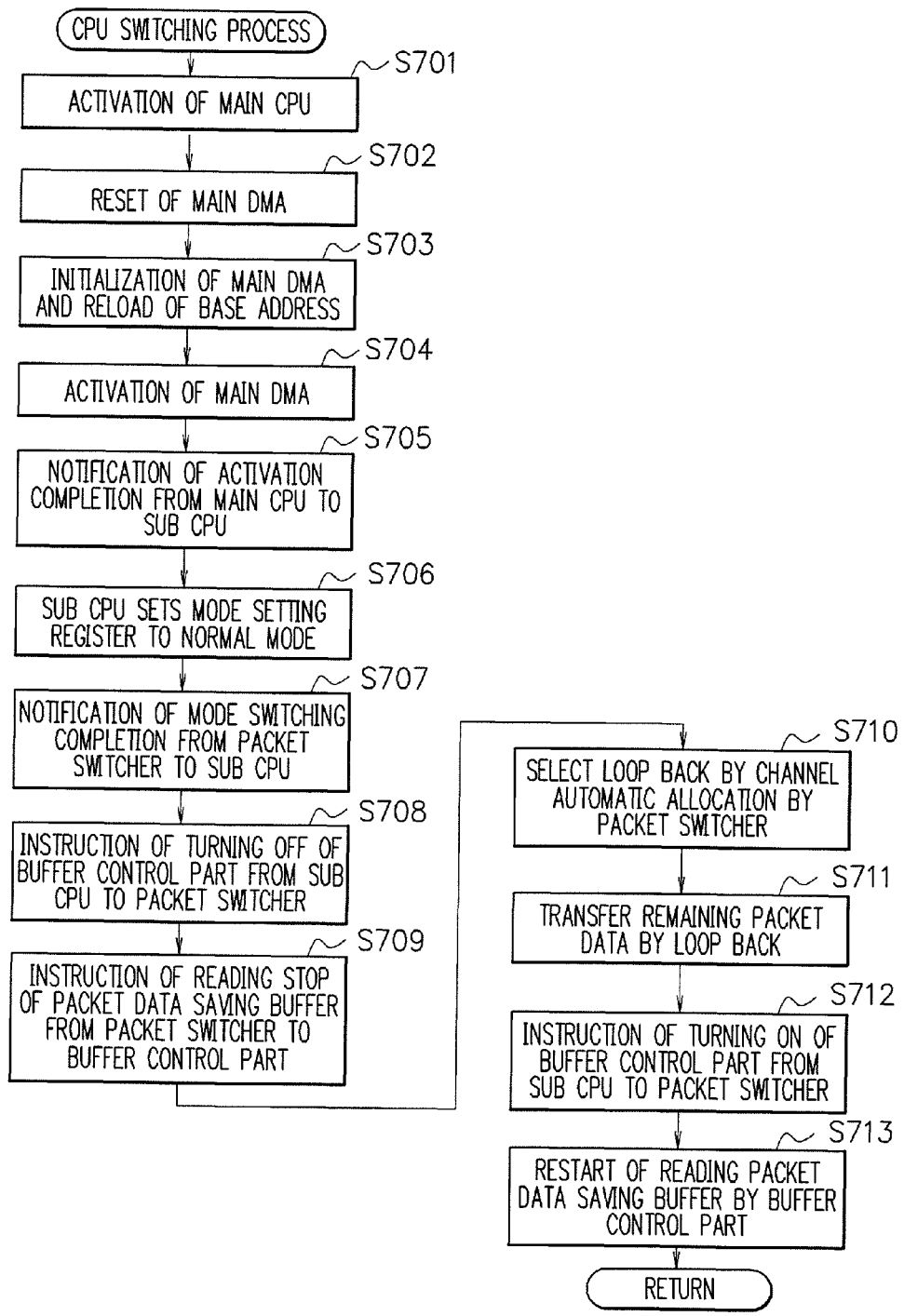
F I G. 13

F I G. 14A
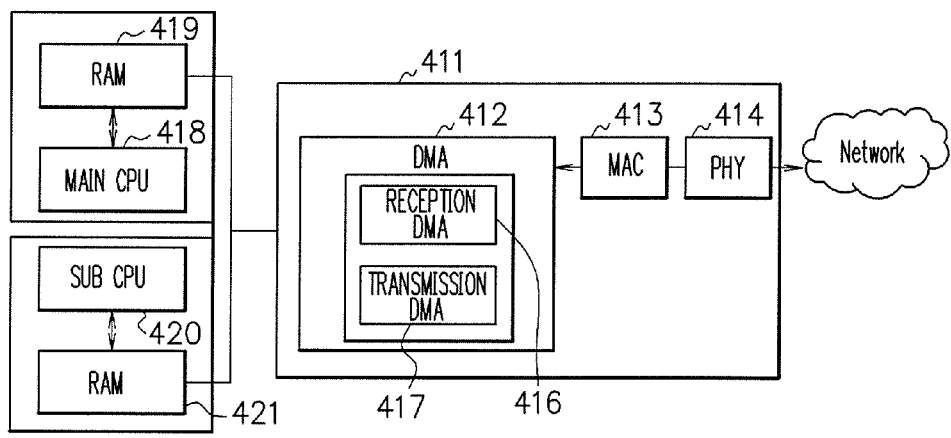
F I G. 14B
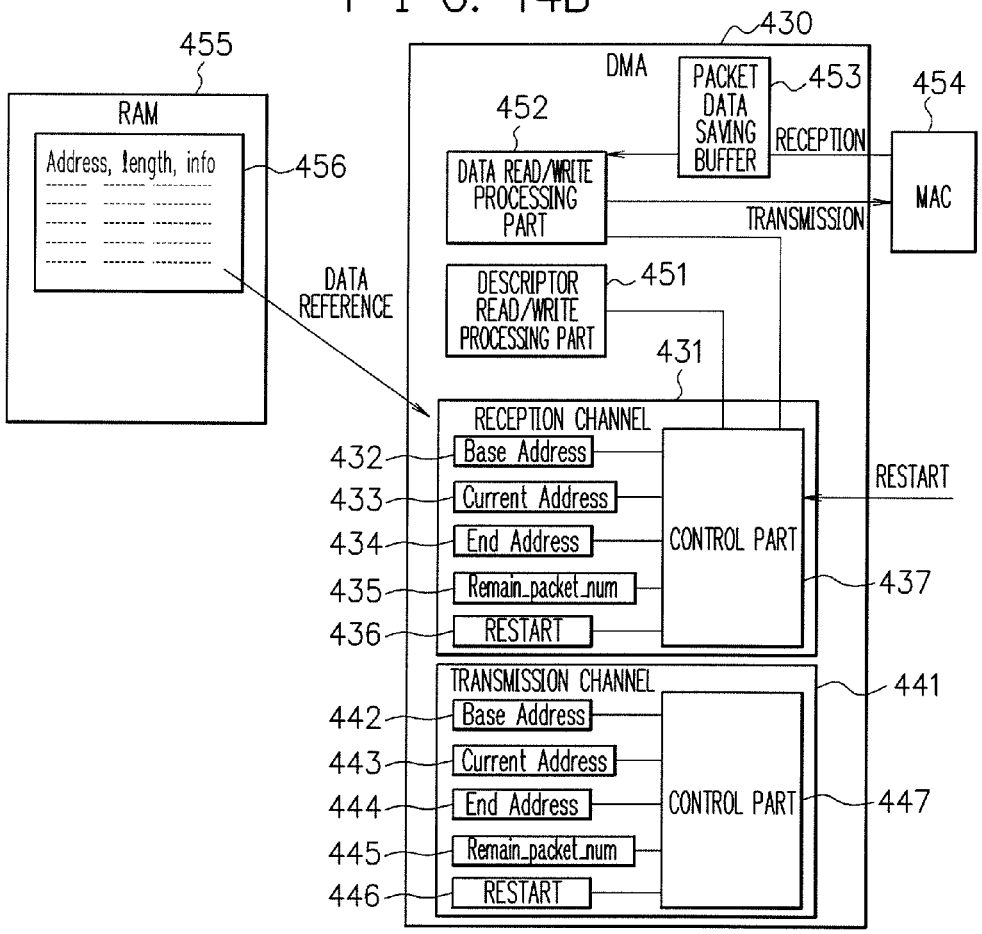

DIRECT MEMORY ACCESS CONTROLLER, CONTROL METHOD THEREOF, AND INFORMATION PROCESSING SYSTEM

CROSS-REFERENCE TO RELATED APPLICATION

This application is based upon and claims the benefit of priority of the prior Japanese Patent Application No. 2013-224637, filed on Oct. 29, 2013, the entire contents of which are incorporated herein by reference.

FIELD

The embodiments discussed herein are directed to a direct memory access controller, a control method thereof, and an information processing system.

BACKGROUND

As for network supported products capable of performing communication by being connected to a communication network, it has been controlled in each region to limit a power consumption value when an operation state of the product is in a standby state. The standby state means a state in which it is possible to resume a function of a product by, for example, a trigger from outside via a network.

To reduce the power consumption in the standby state, there is a system in which a CPU (Central Processing Unit) and a RAM (Random Access Memory) as a normal system are held, and a CPU and a RAM each of whose power consumption at the operation time is lower than the normal system are held as a standby system. When an amount of processes at the system is small, the normal system consuming a large power is stopped, the processes are executed by switching to the standby system whose power consumption is low to thereby reduce the power consumption of the system as a whole in time series.

FIG. 14A is a view illustrating an example of an information processing system including a main CPU and a sub CPU. The information processing system illustrated in FIG. 14A includes a main CPU 418 and a RAM 419 as the normal system mainly performing processes at a normal operation state, and a sub CPU 420 and a RAM 421 as the standby system performing the processes at a standby state, and is connected to a network via a network interface part 411.

The network interface part 411 includes a direct memory access (DMA) controller 412, a media access control (MAC) part 413, and a physical (PHY) part 414. The DMA controller 412 is a DMA controller in a descriptor type executing instructions cited at the RAM, and a reception DMA processing part 416 performs processes relating to reception and a transmission DMA processing part 417 performs processes relating to transmission based on a descriptor stored at the RAM 419 or the RAM 421.

FIG. 14B is a view illustrating an internal configuration of the DMA controller. A DMA controller 430 includes a reception DMA channel 431, a transmission DMA channel 441, a descriptor read/write processing part 451, a data read/write processing part 452, and a packet data saving buffer 453. The descriptor read/write processing part 451 performs processes relating to read and write of descriptor information, the data read/write processing part 452 performs processes relating to data transmitted and received via a MAC part 454. The packet data saving buffer 453 is a buffer holding received packet data.

The reception channel 431 includes a base address register 432, a current address register 433, an end address register 434, a register of the number of remaining packets 435, a restart processing part 436, and a control part 437. A first address of a descriptor 456 put on a RAM 455 is stored at the base address register 432. An end address of the descriptor 456 put on the RAM 455 is stored at the end address register 434. An address of a descriptor corresponding to a packet which is processed next is stored at the current address register 433. Address information of the RAM where the packets are actually disposed, length information of the packet, and information for the process of the packet are included in the descriptor 456.

The register of the number of remaining packets 435 has a function indicating the number of unprocessed packets (remaining packets) at the DMA channel. The restart processing part 436 has a function receiving instructions to stop and start the DMA channel from the main CPU and the sub CPU. When the instruction to stop the DMA channel is received from either of the CPUs, the restart processing part 436 stops a transfer process of a packet data belonging to the DMA channel, and performs a process to clear descriptor information of the DMA channel. Besides, when the instruction to start the DMA channel is received from either of the CPUs, the restart processing part 436 registers a value of the base address register 432 to the current address register 433, performs a process to clear the register of the number of remaining packets 435, and starts a DMA operation. The control part 437 controls information stored at each of the registers 432 to 435.

The transmission channel 441 includes a base address register 442, a current address register 443, an end address register 444, a register of the number of remaining packets 445, a restart processing part 446, and a control part 447. Note that each of functions of these and so on are similar to those of the base address register 432, the current address register 433, the end address register 434, the register of the number of remaining packets 435, the restart processing part 436, and the control part 437 held by the reception channel 431.

An operation flow of the DMA controller 430 is described while using a packet reception as an example. The DMA controller 430 registers the first address of the descriptor 456 to the base address register 432 in an initialization. The DMA controller 430 acquires descriptor information while setting the address registered to the base address register 432 as a first current storage position of the descriptor 456. The DMA controller 430 opens the packet data received in the RAM 455 based on the acquired information, and reflects length information and a process state on the descriptor when one packet is reception-processed. Next, the DMA controller 430 increments a value of the address held by the current address register 433, and acquires next descriptor information. The DMA controller 430 opens the received packet data in the RAM 455 based on the acquired descriptor information when a next packet is received. Subsequently, the process is repeated similarly for the number of received packets.

In the information processing system illustrated in FIG. 14A, when a mode is switched from a normal operation state (normal mode) in which the process is performed by using the main CPU 418 and the RAM 419 being the normal system to a standby state (standby mode) in which the process is performed by using the sub CPU 420 and the RAM 421 being the standby system, and when the mode is switched from the standby mode to the normal mode, new address information relating to the descriptor relative to the DMA controller 430 is set again. FIG. 15 is a flowchart illustrating an operation example including the mode switching of the information processing system illustrated in FIG. 14A. Note that the sub CPU 420 is constantly activated at both the normal mode time and the standby mode time to perform a management of the mode switching. The main CPU 418 is activated at the normal mode time, and stops at the standby mode time.

When the operation is started, the sub CPU 420 is activated (S801). When it is the process using the main CPU 418, namely, when it is the normal mode (TRUE in S802), the main CPU 418 is activated (S803). On the other hand, when it is not the process using the main CPU 418, namely, when it is the standby mode (FALSE in S802), electricity to the main CPU 418 and the RAM 419 is turned off (S804). Subsequently, the DMA controller 430 is reset (S805). After that, the DMA controller 430 is initialized, and after the first address of the descriptor on the RAM is registered to the base address registers 432, 442 (S806), the DMA controller 430 is activated (S807).

After that, the packet transfer process using the DMA controller 430 is performed (S808). At this time, when an instruction of the mode switching from the normal mode to the standby mode, or from the standby mode to the normal mode is received (TRUE in S809), the DMA operation by the DMA controller 430 is stopped (S810), and the process returns to the step S802. Then, the above-stated processes are performed again in accordance with the mode to be switched.

A DMA transfer unit having plural channels provided to correspond to plural input/output units, and exchanging each of them in accordance with a channel priority order, to perform a DMA transfer is proposed (for example, Patent Document 1). A DMA control method selecting one DMA channel from among plural DMA channels in accordance with a register drawing out a priority level which corresponds to a DMA request signal from each I/O is proposed (for example, Patent Document 2). A technology in which usage of a DMA channel is continued until a data transfer using the DMA channel which is in use reaches a boundary condition set in advance, and when the boundary condition occurs, the DMA channel moves to a next DMA channel is proposed (for example, Patent Document 3). A technology in which a sub CPU moves data stored at an SRAM to a DRAM when a state returns to a state performing a process by a main CPU from a state performing a process by the sub CPU is proposed (for example, Patent Document 4).

[Patent Document 1] Japanese Laid-open Patent Publication No. 02-96261

[Patent Document 2] Japanese Laid-open Patent Publication No. 62-50946

[Patent Document 3] Japanese Laid-open Patent Publication No. 10-40211

[Patent Document 4] Japanese Laid-open Patent Publication No. 2010-74256

In the information processing system illustrated in FIG. 14A, processes such as the stop (S810), the reset (S805), and the initialization (S806) of the DMA controller occur as illustrated in FIG. 15 at a transition from the normal mode to the standby mode, and a transition from the standby mode to the normal mode. Accordingly, when a new packet is received from a network during these processes, in other words, during a period when the step S810 and the subsequent steps S802 to S806 illustrated in FIG. 15 are performed, there is a problem in which the packet is dropped out to incur a packet loss.

SUMMARY

An aspect of the DMA controller includes: two channels which include a reception channel and a transmission channel respectively, and perform a data transfer by a DMA in accordance with a descriptor; a mode setting register; and a channel switching part which selects one channel between the two channels in accordance with information set at the mode setting register, detects a boundary of a packet to be transferred, and performs a switching to the selected channel at the detected boundary of the packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a view illustrating a configuration example of an information processing system including a DMA controller according to a first embodiment;

FIG. 2A is a view illustrating an example of a data format according to the present embodiment;

FIG. 2B is a view to explain an analyzing process of a reception packet data according to the present embodiment;

FIG. 5 is a flowchart illustrating an operation example of the information processing system according to the present embodiment;

FIG. 7 is a view illustrating a configuration example of an information processing system including a DMA controller according to a second embodiment;

FIG. 12 is a view illustrating a configuration example of an information processing system including a DMA controller according to a fourth embodiment;

FIG. 13 is a flowchart illustrating a CPU switching process according to the fourth embodiment;

FIG. 14A is a view illustrating an example of an information processing system including a main CPU and a sub CPU;

FIG. 14B is a view illustrating an internal configuration of a DMA controller.

DESCRIPTION OF EMBODIMENTS

Figure 3:
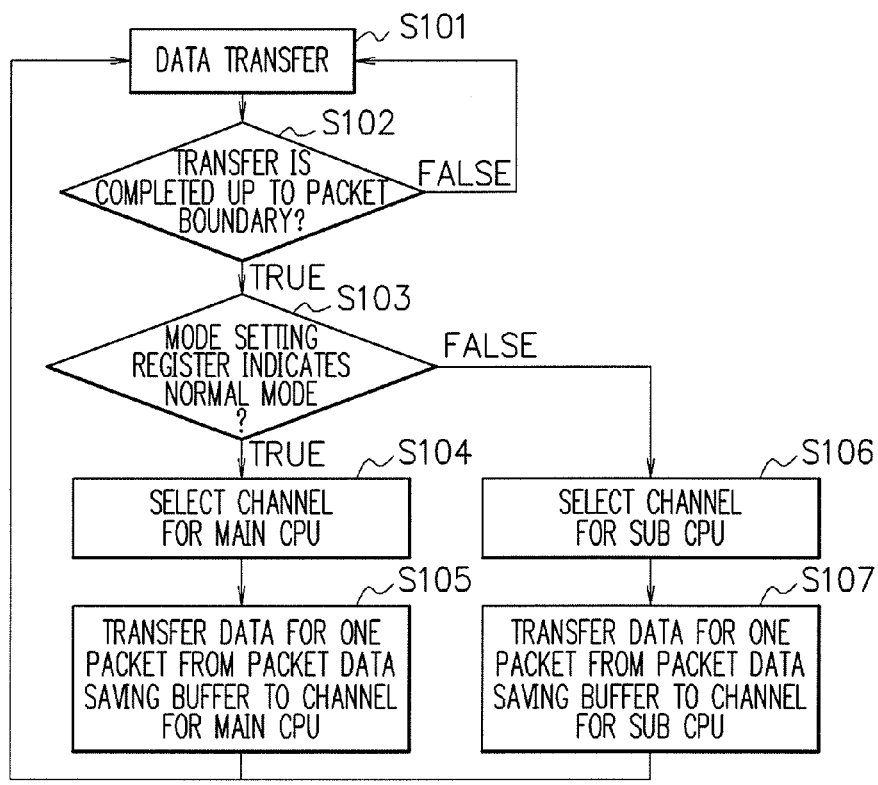
FIG. 3 is a flowchart illustrating an operation example of a channel switching part according to the present embodiment.

Hereinafter, preferred embodiments will be described on the basis of the drawings.

First Embodiment

A first embodiment is described.

FIG. 1 is a view illustrating a configuration example of an information processing system including a direct memory access (DMA) controller according to the first embodiment. As illustrated in FIG. 1, the information processing system includes a DMA controller 10, a main CPU (Central Processing Unit) 20, a RAM (Random Access Memory) 30 for the main CPU, a sub CPU 40, a RAM 50 for the sub CPU, and a media access control (MAC) part 60.

In the information processing system illustrated in FIG. 1, power consumption of a combination of the sub CPU 40 and the RAM 50 is lower than that of a combination of the main CPU 20 and the RAM 30. In a normal operation state (normal mode), the main CPU 20 and the sub CPU 40 are both activated. On the other hand, in a standby state (standby mode), electricity to the main CPU 20 and the RAM 30 as a normal system is turned off and they are stopped, and processes by the sub CPU 40 and the RAM 50 as a standby system are performed. The information processing system is connected to a network via the MAC part 60 and a not-illustrated physical (PHY) part.

The DMA controller 10 is a descriptor type DMA controller performing a DMA transfer of data based on a descriptor 31 stored at the RAM 30 and a descriptor 51 stored at the RAM 50. The DMA controller 10 includes a descriptor read/write processing part 102, a data read/write processing part 103, a channel switching part (packet switcher) 104, a mode setting register 105, and a packet data saving buffer 106.

The DMA controller 10 includes a DMA channel for a main CPU (main CPU channel) 101A and a DMA channel for a sub CPU (sub CPU channel) 101B. Namely, the DMA controller 10 according to the present embodiment includes an individual DMA channel for each of the normal system and the standby system.

The main CPU channel 101A includes a reception DMA channel 111A and a transmission DMA channel 121A. Similarly, the sub CPU channel 101B includes a reception DMA channel 111B and a transmission DMA channel 121B.

Each reception channel 111A (111B) includes a base address register 112A (112B), a current address register 113A (113B), an end address register 114A (114B), a register of the number of remaining packets 115A (115B), a restart processing part 116A (116B), and a control part 117A (117B). Each transmission channel 121A (121B) includes a base address register 122A (122B), a current address register 123A (123B), an end address register 124A (124B), a register of the number of remaining packets 125A (125B), a restart processing part 126A (126B), and a control part 127A (127B).

Respective functions and so on of the base address register, the current address register, the end address register, the register of the number of remaining packets, the restart processing part, and the control part of each of the channels are the same. A first address of a descriptor put on the corresponding RAM is stored at the base address register. An end address of the descriptor put on the corresponding RAM is stored at the end address register. An address of the descriptor corresponding to a packet which is to be processed next is stored at the current address register. Address information of the RAM where the packet is actually disposed, length information of the packet, and information for a process of the packet are included in the descriptor.

The register of the number of remaining packets has a function indicating the number of unprocessed packets (the number of remaining packets) at the DMA channel. The restart processing part has a function receiving instructions to stop and start the DMA channel. When the instruction to stop the DMA channel is received, the restart processing part stops a transfer process of packet data belonging to the DMA channel, and performs a process to clear the descriptor information of the DMA channel. When the instruction to start the DMA channel is received, the restart processing part registers a value of the base address register to the current address register, performs a process to clear the register of the number of remaining packets, and starts the DMA operation. The control part controls information stored at each register.

The descriptor read/write processing part 102 performs processes relating to read and write of the descriptor information. The data read/write processing part 103 performs processes relating to data transferred via the MAC part 60. The packet data saving buffer 106 is a buffer holding a packet data received from the network.

The channel switching part (packet switcher) 104 selects and switches the DMA channel to be used in accordance with information set at the mode setting register 105. A reception processing part 141 of the channel switching part 104 outputs a reception packet data to the selected DMA channel. A transmission packet data from the selected DMA channel is input to a transmission processing part 142 of the channel switching part 104. Information indicating an operating mode of the information processing system, namely, indicating whether it is a normal operation state (normal mode) or a standby state (standby mode) is set at the mode setting register 105. The setting of the information to the mode setting register 105 is performed by the sub CPU 40.

The channel switching part 104 has a packet analyzing process function, and performs the switching of the DMA channels in accordance with the information of the mode setting register 105 at a packet boundary. For example, the information processing system according to the present embodiment receives data from the network in a data format illustrated in FIG. 2A, and stores as a reception packet data 202 to a reception packet buffer 201.

In FIG. 2A, a data format of a TCP/IPv4 including an Ethernet header part 203, an IP header part 204, a TCP header part 205, a payload part 206, and a trailer 207 is illustrated as an example. For example, a data size of a total IP packet can be acquired from a Total Length field of the IP header part 204, and a TCP header size can be acquired from a Data Offset field of the TCP header part 205. A data size of the payload part 206 can be acquired from the data size of the total IP packet acquired from the IP header part 204 and the TCP header size acquired from the TCP header part 205.

As illustrated in FIG. 2B, when a packet is received, a packet header analyzing part 211 of the channel switching part 104 extracts and analyzes a header data of the reception packet data 202 from the reception packet buffer, and transfers the analyzed header information to a reception packet processing part 212. The reception packet processing part 212 acquires the reception packet data from the reception packet buffer based on the header information acquired from the packet header analyzing part 211. The reception packet processing part 212 extracts a payload data from the reception packet data, stores as a reception payload data 214 to a packet data memory, and sets packet information at a reception descriptor 213. The channel switching part 104 executes these processes by one packet unit.

FIG. 3 is a flowchart illustrating an operation example of the channel switching part 104 at a packet reception time. The channel switching part 104 performs a data transfer for the selected DMA channel until the transfer up to the packet boundary completes based on the data size and so on acquired from the information of the header part of the received packet data (S101).

When the transfer up to the packet boundary completes (TRUE in S102), the channel switching part 104 selects the main CPU channel 101A (S104) when the information set at the mode setting register 105 is the information indicating the normal mode (TRUE in S103). Subsequently, the channel switching part 104 starts a data transfer for one packet from the packet data saving buffer 106 to the main CPU channel 101A (S105), and the process returns to the step S101.

On the other hand, the channel switching part 104 selects the sub CPU channel 101B (S106) when the information set at the mode setting register 105 is not the information indicating the normal mode, namely, the information indicating the standby mode (FALSE in S103). Subsequently, the channel switching part 104 starts the data transfer for one packet from the packet data saving buffer 106 to the sub CPU channel 101B (S107), and the process returns to the step S101.

In the packet reception process at the information processing system according to the present embodiment, the packet data is stored to a reception packet area on the RAM every time when one packet is received. Then according to the flowchart illustrated in FIG. 4, presence/absence of the packet data on the RAM is distinguished, and the packets are processed one by one. Namely, even if a new packet is received during a period from the reception of the packet to the mode switching process, the packet data is sequentially processed after it is saved at the reception packet area on the RAM at any time, and therefore, there is no effect on the mode switching process and so on.

Figure 4:
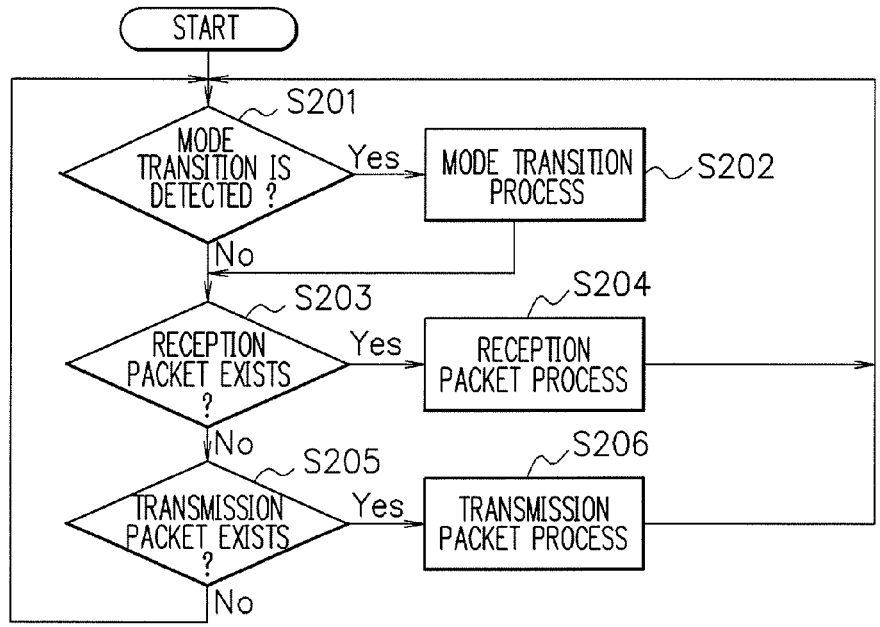
FIG. 4 is a flowchart illustrating a packet transfer process according to the present embodiment.

FIG. 4 is a flowchart illustrating a packet transfer process according to the present embodiment. When the information processing system detects a transition from the normal mode to the standby mode or a transition from the standby mode to the normal mode (Yes in S201), a mode transition process (S202) is performed. After that, when the reception packet exists on the RAM (Yes in S203), the reception packet process is performed (S204), and when the transmission packet exists on the RAM (Yes in S205), the transmission packet process is performed (S206).

FIG. 5 is a flowchart illustrating an operation example including the mode switching of the information processing system according to the present embodiment. When the operation is started, the sub CPU 40 is activated (S301). Subsequently, a function part relating to the sub CPU in the DMA controller 10 (hereinafter, called as a sub DMA) is reset (S302). After that, the sub DMA in the DMA controller 10 is initialized, the first address of the descriptor on the RAM 50 is registered to the base address registers 112B, 122B (S303), and thereafter, the sub DMA is activated (S304).

Next, the main CPU 20 is activated (S305). Subsequently, a function part relating to the main CPU in the DMA controller 10 (hereinafter, called as a main DMA) is reset (S306). After that, the main DMA in the DMA controller 10 is initialized, the first address of the descriptor on the RAM 30 is registered to the base address registers 112A, 122A (S307), and thereafter, the main DMA is activated (S308). The processes of the above-stated steps S301 to S308 are not limited to the illustrated process sequence, and the processes of the steps S301 to S304 are to be performed in the illustrated sequence, and the processes of the steps S305 to S308 are to be performed in the illustrated sequence.

Next, the sub CPU 40 writes the information indicating the normal mode to the mode setting register 105 of the DMA controller 10 (S309). After that, the packet transfer process using the DMA controller 10 is performed (S310). At this time, when the instruction in which the switching of the mode setting register 105, namely, the mode switching from the normal mode to the standby mode, or from the standby mode to the normal mode is necessary is received (TRUE in S311), a CPU switching process (S312) is performed, and the process returns to the step S310.

Figure 6:
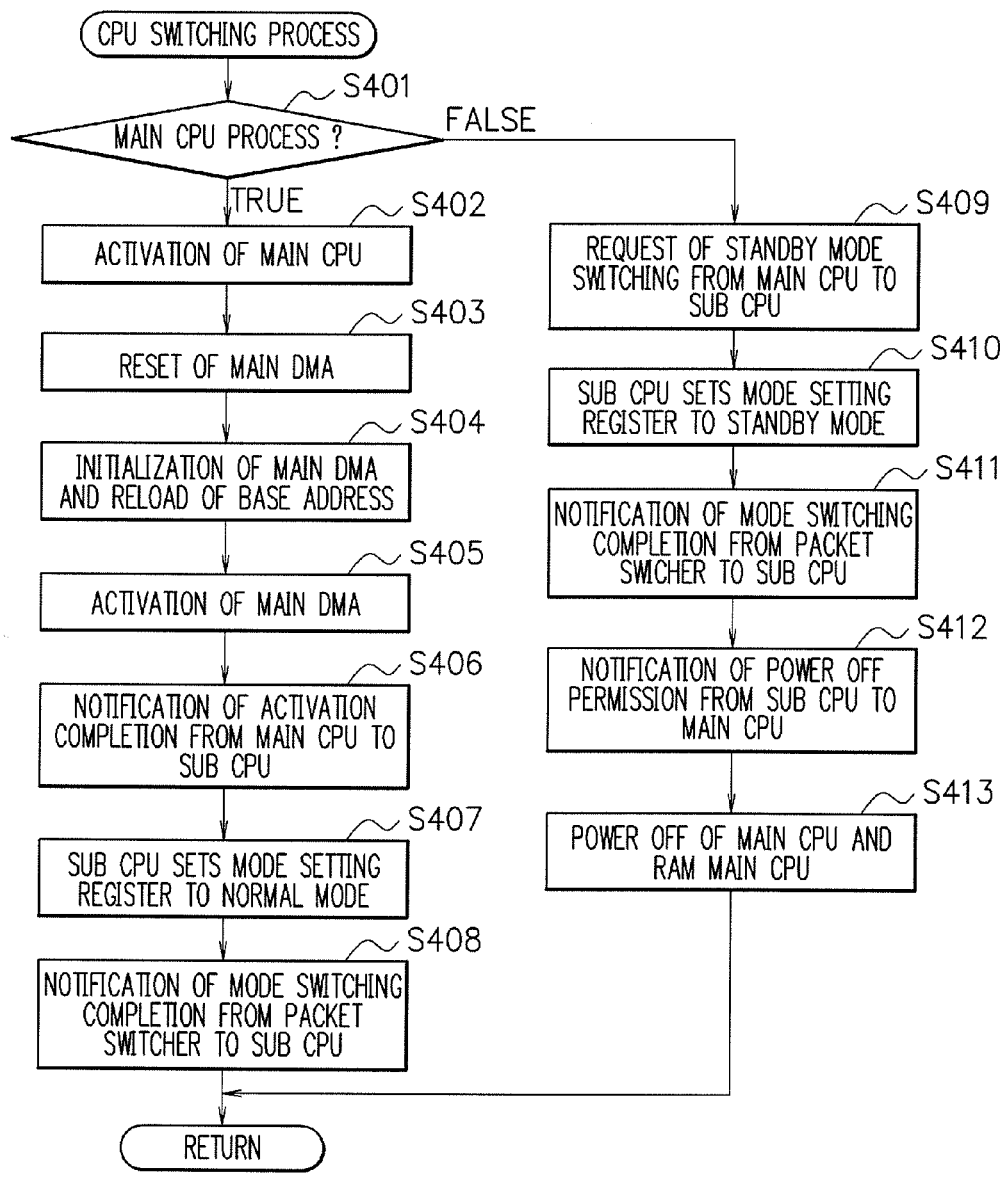
FIG. 6 is a flowchart illustrating a CPU switching process according to the first embodiment.

FIG. 6 is a flowchart illustrating the CPU switching process according to the first embodiment illustrated in FIG. 5. In the CPU switching process, the main CPU 20 which is stopped until that time is activated (S402) when it is the process using the main CPU 20, namely, the mode is the normal mode (TRUE in S401). Subsequently, the main DMA in the DMA controller 10 is reset (S403). After that, the main DMA in the DMA controller 10 is initialized, the first address of the descriptor on the RAM 30 is reloaded to the base address registers 112A, 122A (S404), and thereafter, the main DMA is activated (S405).

The main CPU 20 notifies the sub CPU 40 of an activation completion (S406). The sub CPU 40 receiving the notification of the activation completion from the main CPU 20 sets the information indicating the normal mode at the mode setting register 105 of the DMA controller 10 (S407). Subsequently, the channel switching part 104 of the DMA controller 10 switches the DMA channel to be used to the main CPU channel 101A in accordance with the information set at the mode setting register 105, notifies the sub CPU 40 of a mode switching completion (S408), and completes the CPU switching process.

On the other hand, if it is not the process using the main CPU 20 (FALSE in S401), the main CPU 20 requests the sub CPU 40 to switch to the standby mode (S409). The sub CPU 40 receiving the request to the standby mode switching sets the information indicating the standby mode at the mode setting register 105 of the DMA controller 10 (S410). Subsequently, the channel switching part 104 of the DMA controller 10 switches the DMA channel to be used to the sub CPU channel 101B in accordance with the information set at the mode setting register 105, and notifies the sub CPU 40 of the mode switching completion (S411).

Next, the sub CPU 40 receiving the notification of the mode switching completion notifies the main CPU 20 of a power-off permission (S412). Then, electricity to the main CPU 20 and the RAM 30 for the main CPU is turned off (S413), and the CPU switching process is completed.

According to the first embodiment, the DMA channel 101A for the main CPU and the DMA channel 101B for the sub CPU are each provided at the DMA controller 10, the channel switching part 104 automatically selects the DMA channel to be used in accordance with the information set at the mode setting register 105, and performs the switching to the selected DMA channel at the packet boundary. It is thereby possible to perform the mode switching without performing re-setting of the information while stopping the DMA operation when the mode switching is performed, namely, without interrupting the DMA operation. Accordingly, the mode switching is enabled without incurring the deterioration of the communication quality caused by a packet loss, and it is possible to enable power saving by reducing the power consumption at the information processing system.

Note that the DMA channel switching by the channel switching part 104 is the switching with reference to the mode setting register 105, and therefore, it is possible to perform within a very short period of time (for example, one clock cycle to a few clock cycles).

Second Embodiment

Next, a second embodiment is described.

In the above-stated first embodiment, at the transition time from the normal mode to the standby mode, the notification of the power-off permission is received from the sub CPU 40, and the electricity to the main CPU 20 and the RAM 30 for the main CPU is turned off. At this time, there is a possibility in which an untransmitted data remain in the transmission channel 121A of the main CPU channel 101A at the DMA controller 10. The descriptor type DMA controller continues the operation until the descriptor becomes empty, and therefore, when the untransmitted data remains in the transmission channel 121A of the main CPU channel 101A after the electricity to the main CPU 20 and the RAM 30 is turned off, the access to the RAM 30 is performed, and a bus access error occurs.

To avoid the occurrence of the bus access error, it is conceivable for the sub CPU 40 to reset the transmission channel 121A by using a restart processing part of the main CPU channel 101A before the notification of the power-off permission is performed for the main CPU 20. The transmission channel 121A is thereby initialized, and the access for the RAM 30 does not occur after the electricity to the RAM 30 is turned off. However, it is impossible for the sub CPU 40 to recognize the packet boundary of the transmission packet, and therefore, there is a possibility in which a corrupted packet having an incomplete format is transmitted to the network when the transmission channel 121A is restarted during the transmission process.

Besides, it is conceivable that it is controlled such that the sub CPU 40 does not perform the notification of the power-off permission to the main CPU 20 until the remaining data of the transmission channel 121A of the main CPU channel 101A does not exist (until a value of the register of the number of remaining packets 125A becomes "0" (zero)). However, a timing of transition from the normal mode to the standby mode delays, and the power consumption increases.

The second embodiment described below is one in which the occurrence of the bus access error is surely avoided at the transition time from the normal mode to the standby mode without incurring the above-stated problems. FIG. 7 is a view illustrating a configuration example of an information processing system including a DMA controller according to the second embodiment. In FIG. 7, the same reference numerals and symbols are used for components having the same function as the components illustrated in FIG. 1, and the redundant description is not given.

The DMA controller 10 according to the second embodiment includes a restart timing adjustment part 107 as illustrated in FIG. 7. The restart timing adjustment part 107 receives an execution request of a restart process of the transmission channel 121A of the main CPU channel 101A from the sub CPU 40, and requests information of a boundary timing of a transmission packet for the channel switching part 104. The restart timing adjustment part 107 executes a restart of the transmission channel 121A at the boundary timing of the transmission packet based on the information acquired from the channel switching part 104, and notifies the sub CPU 40 of a restart completion of the transmission channel 121A.

Figure 8:
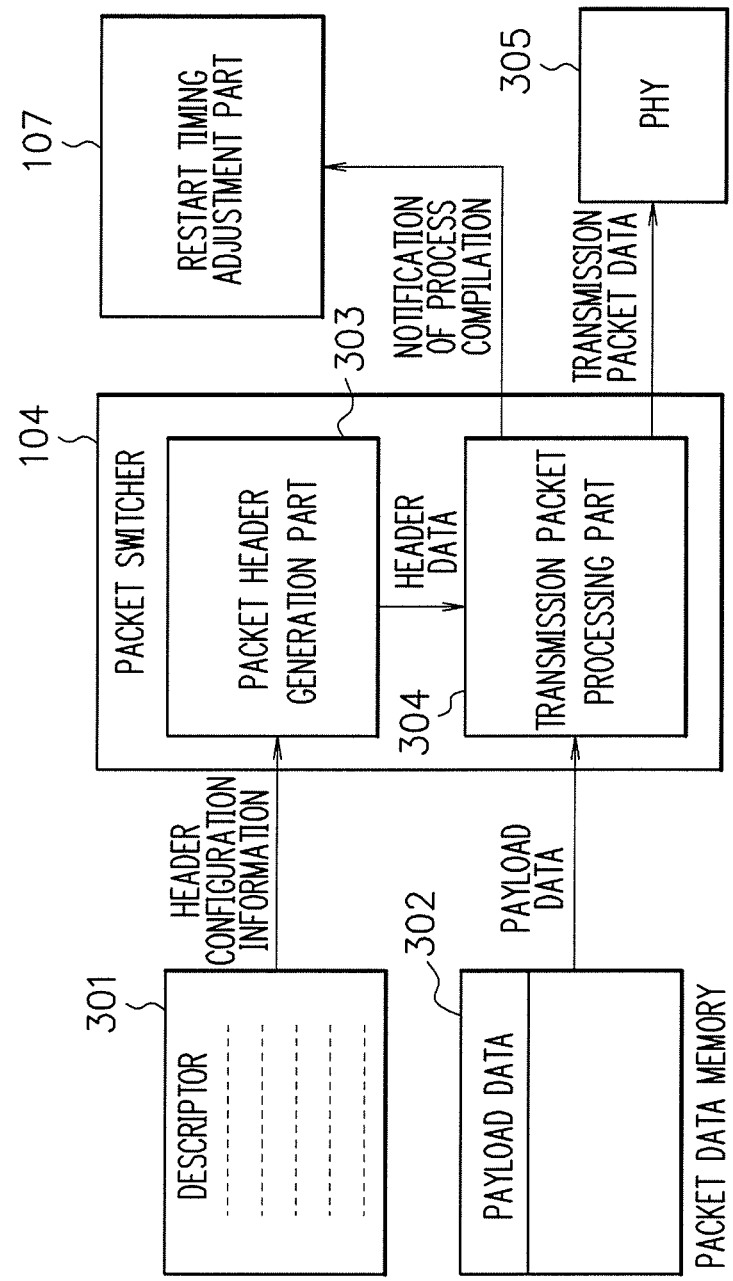
FIG. 8 is a view to explain a generation process of a transmission packet data according to the present embodiment.

As illustrated in FIG. 8, when a packet is transmitted, a packet header generation part 303 of the channel switching part 104 acquires header configuration information to generate a packet header from a transmission descriptor 301, and generates the header. A transmission packet processing part 304 acquires header data generated by the packet header generation part 303, and acquires a payload data 302 of the transmission packet from a packet data memory indicated by the transmission descriptor 301 to generate the transmission packet. The transmission packet processing part 304 transfers the transmission packet to a physical (PHY) part 305 when the generation is completed. The transmission packet processing part 304 outputs a process completion notification to the restart timing adjustment part 107 every time when one packet is transferred to the physical part 305. It is possible for the channel switching part 104 to distinguish the packet boundary based on the header information when the header of the transmission packet is generated as same as the header analyzation of the reception packet.

Figure 9:
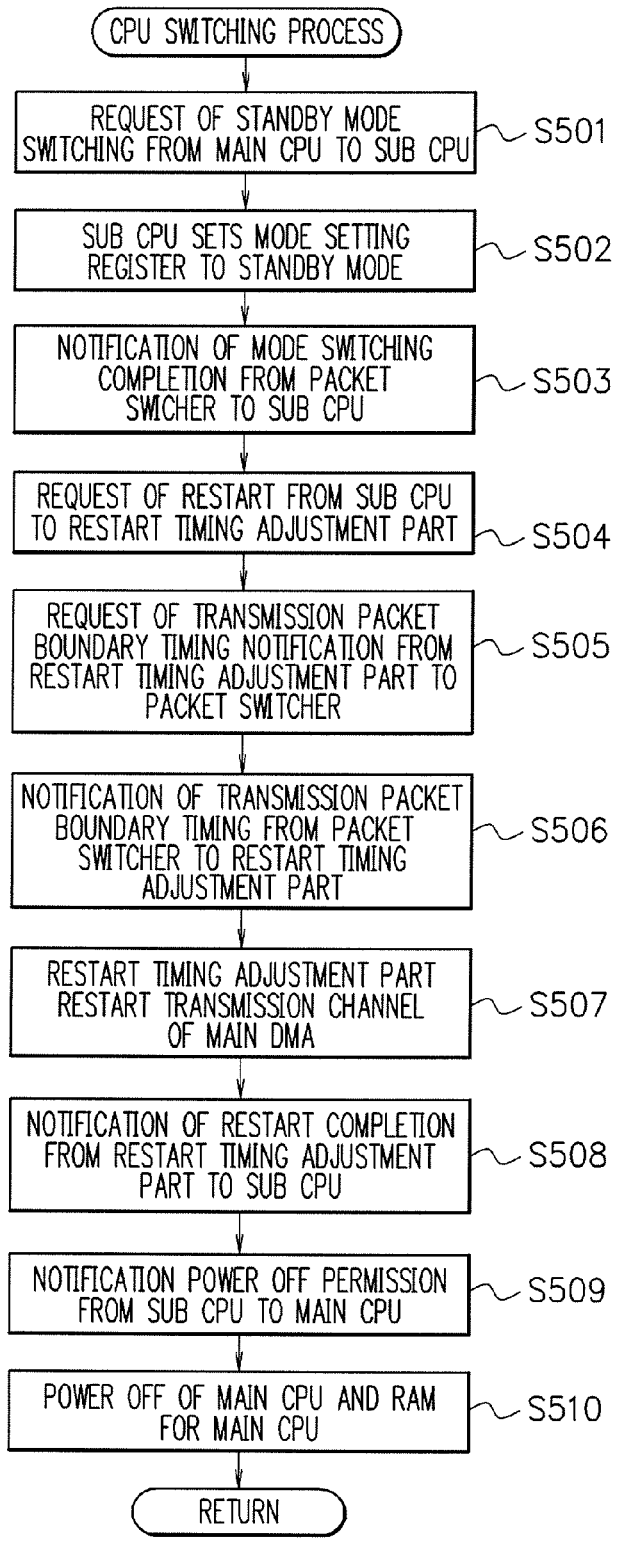
FIG. 9 is a flowchart illustrating a CPU switching process according to the second embodiment.

Operations of the information processing system according to the second embodiment are different from the first embodiment in the CPU switching process, but the others are the same as the operations of the first embodiment illustrated in FIG. 5. FIG. 9 is a flowchart illustrating the CPU switching process in the second embodiment. Note that FIG. 9 illustrates processes at the transition time from the normal mode to the standby mode from among the CPU switching process. The process at the transition time from the standby mode to the normal mode is the same as the first embodiment, and the processes of the steps S402 to S408 illustrated in FIG. 6 are executed.

In the CPU switching process in the second embodiment, the main CPU 20 requests the sub CPU 40 to switch to the standby mode if it is not the process using the main CPU 20 (S501). The sub CPU 40 receiving the request to the standby mode switching sets information indicating the standby mode at the mode setting register 105 of the DMA controller 10 (S502). Subsequently, the channel switching part 104 of the DMA controller 10 switches the DMA channel to be used to the sub CPU channel 101B in accordance with the information set at the mode setting register 105, and notifies the sub CPU 40 of a mode switching completion (S503).

The sub CPU 40 receiving the notification of the mode switching completion from the channel switching part 104 requests the restart timing adjustment part 107 to execute the restart process of the transmission channel 121A of the main CPU channel 101A (S504). The restart timing adjustment part 107 requests the channel switching part 104 to notify the information of the boundary timing of the transmission packet (S505). The channel switching part 104 notifies the restart timing adjustment part 107 of the information of the boundary timing of the transmission packet transmitted by the transmission channel 121A (S506).

Subsequently, the restart timing adjustment part 107 detects a timing to complete the transmission of one packet which is in transmission by the transmission channel 121A based on the information from the channel switching part 104, controls the restart processing part 126A of the transmission channel 121A at the timing to execute the restart (S507). The transmission channel 121A of the main CPU channel 101A is thereby reset. The restart timing adjustment part 107 notifies the sub CPU 40 of a restart completion of the transmission channel 121A (S508).

Next, the sub CPU 40 receiving the notification of the restart completion of the transmission channel 121A notifies the main CPU 20 of the power-off permission (S509). The electricity to the main CPU 20 and the RAM 30 for the main CPU is turned off (S510), and the CPU switching process is completed.

According to the second embodiment, it is possible to perform the mode switching without performing the re-setting of the information while stopping the DMA operation when the mode switching is performed, namely, without interrupting the DMA operation as same as the first embodiment. Accordingly, the mode switching is enabled without incurring the deterioration of the communication quality caused by the packet loss, and it is possible to enable the power saving by reducing the power consumption at the information processing system. Besides, at the transition time from the normal mode to the standby mode, it is possible to surely avoid the occurrence of the bus access error without incurring problems such as transmission of the corrupted packet and so on.

Third Embodiment

Next, a third embodiment is described.

In the above-stated embodiments, at the transition time from the standby mode to the normal mode, a packet from the network is received at the sub CPU side from a time when the instruction indicating that the mode switching from the standby mode to the normal mode is necessary to a time when the activation of the main CPU, the activation of the main DMA at the DMA controller 10, and the channel switching to the main CPU channel 101A complete. This received packet is necessary to be passed to the main CPU side, and it is conceivable to transfer by an inter-CPU communication, but a control becomes complicated if the inter-CPU communication is performed. Besides, it takes time to transfer the packet data from the sub CPU side to the main CPU side by the inter-CPU communication, and therefore, deterioration of latency of a packet response and the occurrence of the packet loss are incurred during the period, and there is a possibility in which the communication quality deteriorates.

Figure 10:
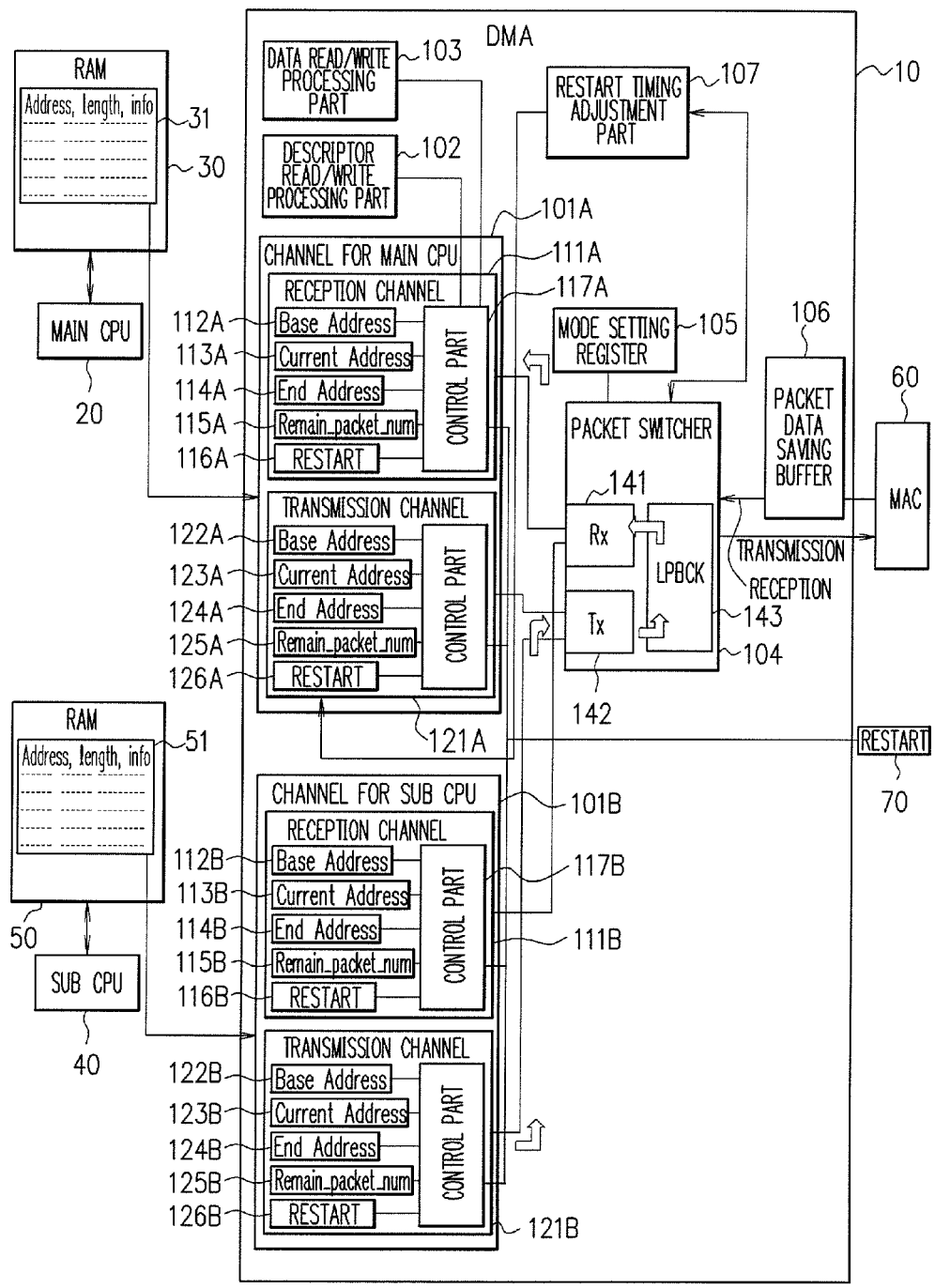
FIG. 10 is a view illustrating a configuration example of an information processing system including a DMA controller according to a third embodiment.

In the third embodiment, a loop back processing part 143 is provided in the DMA controller 10 as illustrated in FIG. 10. FIG. 10 is a view illustrating a configuration example of an information processing system including the DMA controller according to the third embodiment. In FIG. 10, the same reference numerals and symbols are used for components having the same function as the components illustrated in FIG. 1 and FIG. 7, and the redundant description is not given.

The loop back processing part 143 transfers a packet data transmitted from the transmission channel 121B of the sub CPU channel 101B to the reception channel 111A of the main CPU channel 101A. Note that a control whether or not the loop back processing unit 143 is operated may be performed by providing, for example, a loop back mode setting register and the sub CPU 40 setting information thereof. The control may be performed by expanding the mode setting register 105 such that the information indicating whether or not the loop back is performed can be set.

Figure 11:
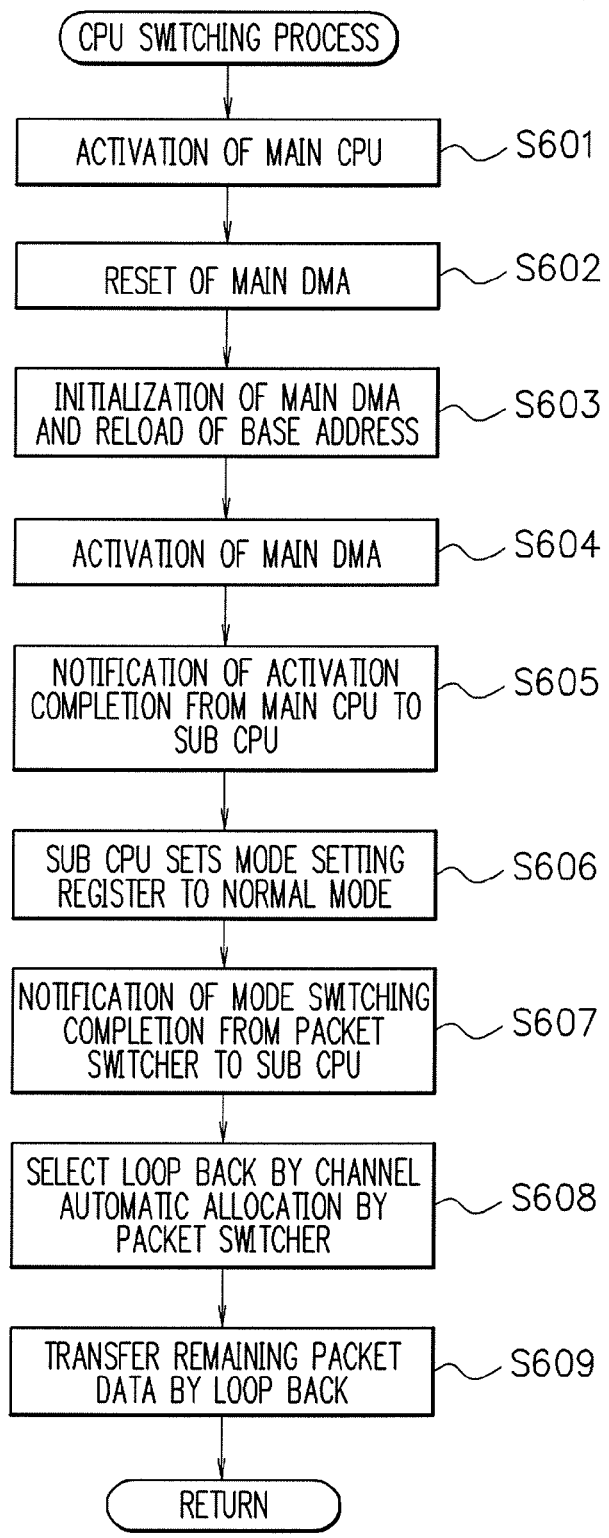
FIG. 11 is a flowchart illustrating a CPU switching process according to the third embodiment.
Figure 15:
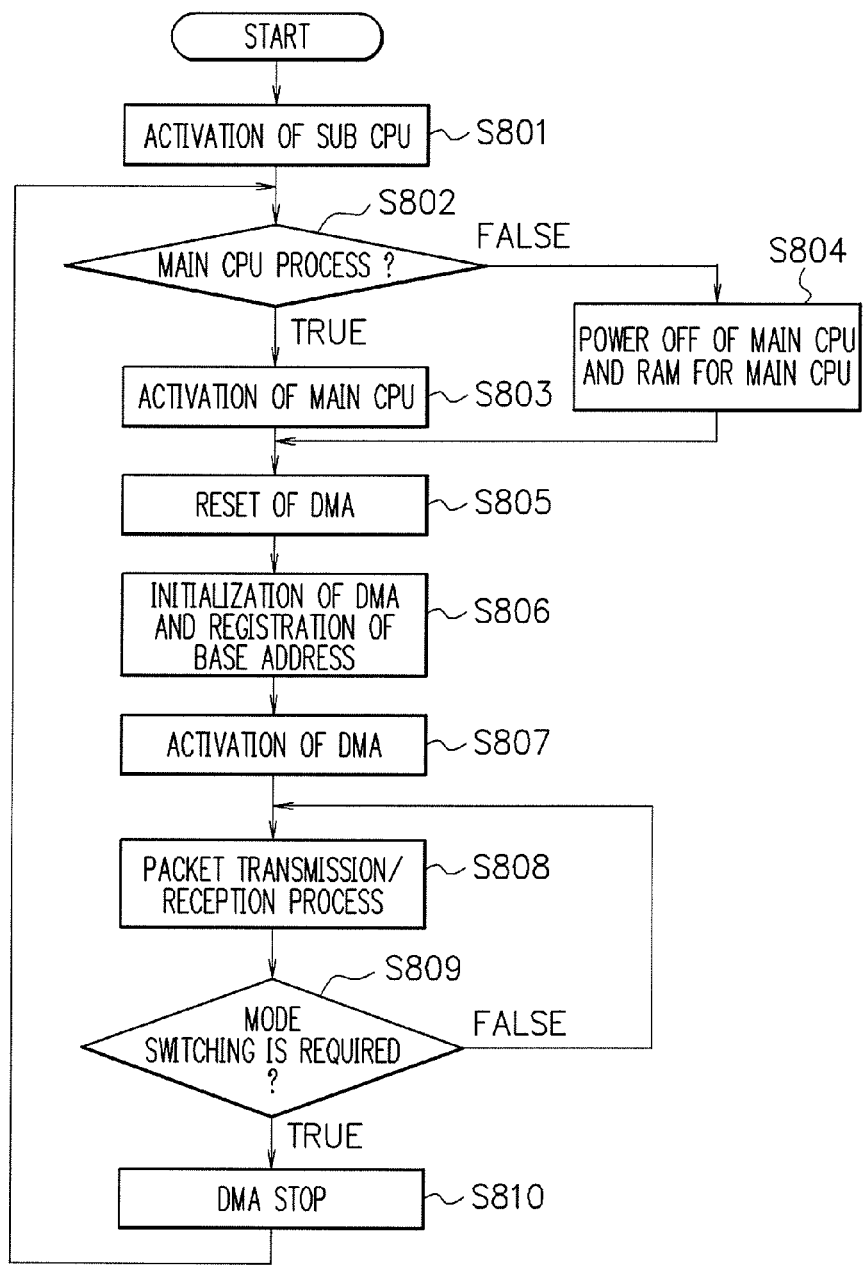
FIG. 15 is a flowchart illustrating an operation example of the information processing system illustrated in FIG. 14A.

Operations of the information processing system according to the third embodiment are different from the first embodiment in the CPU switching process, but the others are the same as the operations in the first embodiment illustrated in FIG. 5. FIG. 11 is a flowchart illustrating a CPU switching process according to the third embodiment. Note that in FIG. 11, a process at the transition time from the standby mode to the normal mode is illustrated from among the CPU switching process. The process at the transition time from the normal mode to the standby mode is the same as the second embodiment, and the processes illustrated in FIG. 9 are executed.

In the CPU switching process according to the third embodiment, the main CPU 20 stopped until that time is activated (S601) when it is the process using the main CPU 20, namely, it is the normal mode. Thereafter, the processes at steps S602 to S607 are the same as the processes at the steps S403 to S408 in the first embodiment illustrated in FIG. 6, and therefore, the description is not given.

After the channel switching part 104 of the DMA controller 10 notifies the sub CPU 40 of the mode switching completion, the channel switching part 104 selects a loop back by the loop back processing part 143 by a channel automatic allocation based on the setting information from the sub CPU 40 (S608), and the transfer of the remaining reception packet data is performed (S609). The packet data is thereby transferred from the RAM 50 for the sub CPU to the RAM 30 for the main CPU via the transmission channel 121B of the sub CPU channel 101B, the loop back processing part 143 of the channel switching part 104, and the reception channel 111A of the main CPU channel 101A. When a packet is received from the network during the transfer of the packet data by the loop back, the channel switching part 104 transmits the packet data received from the network to the reception channel 111B of the sub CPU channel 101B.

According to the third embodiment, it is possible to perform the mode switching without performing the re-setting of the information while stopping the DMA operation when the mode switching is performed, namely, without interrupting the DMA operation as same as the first embodiment. Accordingly, the mode switching is possible without incurring the deterioration of the communication quality caused by the packet loss, and it is possible to enable the power saving by reducing the power consumption at the information processing system.

Besides, according to the third embodiment, the loop back mechanism is provided, and thereby, when the packet data received at the sub CPU side remains at the switching time from the standby mode to the normal mode, it becomes possible to transfer the packet data from the RAM 50 for the sub CPU to the RAM 30 for the main CPU without performing the inter-CPU communication. Besides, at the main CPU side, it is possible to perform the process of the packet data received by the loop back as if the packet data is received from the network.

Fourth Embodiment

Next, a fourth embodiment is described.

In the DMA controller 10, when the DMA channel to be used is switched from the sub CPU channel 101B to the main CPU channel 101A, a timing when a packet data is transferred from the network is not known, and therefore, there is a case when the packet is input to the sub CPU side just before the DMA channel is switched. In this case, it is necessary to transfer the packet data from the sub CPU side to the main CPU side, and if a packet which is received after the packet to be transferred is received is input to the main CPU side prior to the packet to be transferred, a packet order reversal may occur at the main CPU side and it may cause the deterioration of the communication quality.

Accordingly, in the DMA controller 10 of the fourth embodiment, a buffer control part 108 is provided and an instruction processing part 144 is provided in the channel switching part 104 as illustrated in FIG. 12, and it is controlled such that reading is not performed even if there is a received data in the packet data saving buffer 106 during the transfer of the packet data by the loop back. FIG. 12 is a view illustrating a configuration example of an information processing system including the DMA controller according to the fourth embodiment. In FIG. 12, the same reference numerals and symbols are used for components having the same function as the components illustrated in FIG. 1, FIG. 7, and FIG. 10, and the redundant description is not given.

The instruction processing part 144 receives an instruction of start and stop of the transfer of the packet data by the loop back from the sub CPU, and notifies the loop back processing part 143 of the start and stop of the transfer by the loop back. The buffer control part 108 controls reading of the packet data saving buffer 106 in accordance with the notification from the instruction processing part 144. When an instruction of stop of the reading is received from the instruction processing part 144, the buffer control part 108 suppresses the reading of the packet data received at the packet data saving buffer 106. When an instruction of restart of the reading is received from the instruction processing part 144, the buffer control part 108 restarts the reading of the packet data saving buffer 106 at a timing receiving the instruction.

Operations of the information processing system according to the fourth embodiment are different from the first embodiment in the CPU switching process, but the others are the same as the operations in the first embodiment illustrated in FIG. 5. FIG. 13 is a flowchart illustrating the CPU switching process according to the fourth embodiment. Note that in FIG. 13, processes at the transition time from the standby mode to the normal mode are illustrated from among the CPU switching process. The processes at the transition time from the normal mode to the standby mode are the same as the second embodiment, and the processes illustrated in FIG. 9 are executed.

In the CPU switching process according to the fourth embodiment, when it is the process using the main CPU 20, namely, it is the normal mode, the main CPU 20 which is stopped until that time is activated (S701). After that, processes in steps S702 to S707 are the same as the processes in the steps S403 to S408 according to the first embodiment illustrated in FIG. 6, and therefore, the description is not given.

When the notification of the mode switching completion is received from the channel switching part 104, the sub CPU 40 instructs the instruction processing part 144 of the channel switching part 104 to turn off the buffer control part 108 (S708). The instruction processing part 144 receiving the instruction from the sub CPU 40 instructs the stop of the reading of the packet data saving buffer 106 to the buffer control part 108 (S709). The reading of the packet data received at the packet data saving buffer 106 is thereby suppressed.

Subsequently, the channel switching part 104 selects the loop back by the loop back processing part 143 by the channel automatic allocation based on the setting information from the sub CPU 40 (S710), and the transfer of the remaining reception packet data is performed (S711). The packet data is thereby transferred from the RAM 50 for the sub CPU to the RAM 30 for the main CPU via the transmission channel 121B of the sub CPU channel 101B, the loop back processing part 143 of the channel switching part 104, and the reception channel 111A of the main CPU channel 101A.

When the transfer of the remaining reception packet data from the RAM 50 for the sub CPU to the RAM 30 for the main CPU is completed, the sub CPU 40 instructs the instruction processing part 144 to turn on the buffer control part 108 (S712). The instruction processing part 144 receiving the instruction from the sub CPU 40 instructs the restart of the reading of the packet data saving buffer 106 to the buffer control part 108 (S713). The reading of the packet data saving buffer 106 is thereby restarted, and the packet data held at the packet data saving buffer 106 are sequentially input to the main CPU channel 101A.

According to the fourth embodiment, it is possible to perform the mode switching without performing the re-setting of the information while stopping the DMA operation when the mode switching is performed, namely, without interrupting the DMA operation as same as the first embodiment. Besides, it is possible to prevent the order reversal of the reception packet data which may occur at the switching time of the DMA channels. Accordingly, the mode switching is enabled without incurring the deterioration of the communication quality caused by the packet loss and the order reversal of the packets, and it is possible to enable power saving by reducing the power consumption at the information processing system.

In the above-stated description, the reading of the packet data saving buffer 106 is stopped during the transfer of the packet data by the loop back, but the packet data received from the network during the transfer of the packet data by the loop back may be transferred to the reception channel 111B of the sub CPU channel 101B without stopping the reading of the packet data saving buffer 106. The reading of the packet data saving buffer 106 may be controlled to be stopped just before the transfer of the remaining reception packet data is completed and the transfer by the loop back is stopped.

Incidentally, the above-described embodiments are to be considered in all respects as illustrative and no restrictive. Namely, the present invention may be embodied in other specific forms without departing from the spirit or essential characteristics thereof.

The disclosed DMA controller is able to perform the switching of the channels without interrupting the DMA operation, and the mode switching becomes possible without incurring the deterioration of the communication quality caused by the packet loss.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A direct memory access controller, comprising:
a first channel which includes a first reception channel and
a first transmission channel, and performs a data transfer by a direct memory access in accordance with a descriptor acquired from a first memory;

a second channel which includes a second reception channel and a second transmission channel, and performs the data transfer by a direct memory access in accordance with a descriptor acquired from a second memory;

a mode setting register; and a channel switching part which selects one channel between the first channel and the second channel in accordance with information set at the mode setting register, detects a boundary of a packet to be transferred, and performs a switching to the selected channel at the detected boundary of the packet, by one packet unit, wherein the channel switching part detects the boundary of the packet based on data size information acquired from a header of the packet to be transferred, the second channel transmits a data, received at the second reception channel while a switching of the channels is performed, from the second transmission channel after the switching of the channels is completed when a switching from the second channel to the first channel is performed, and the channel switching part includes a transferring part which transfers the data, transmitted from the second transmission channel after the switching of the channels is completed, to the first reception channel when the switching from the second channel to the first channel is performed.

2. The direct memory access controller according to claim 1, further comprising:

a buffer which stores received data, wherein the channel switching part suppresses reading of data from the buffer while a transfer of data by the transferring part is executed, reads the data from the buffer and transfers to the first channel after the transfer of the data by the transferring part.

3. The direct memory access controller according to claim 1, wherein a reset process of the first transmission channel is executed at the boundary of the packet detected by the channel switching part when a switching from the first channel to the second channel is performed.

4. The direct memory access controller according to claim 1, wherein information indicating whether a first mode or a second mode being an operation in lower power consumption than the first mode is set at the mode setting register, and the channel switching part selects the first channel when the information set at the mode setting register indicates the first mode, and selects the second channel when the information set at the mode setting register indicates the second mode.

5. A control method of a direct memory access controller including: a first channel which includes a first reception channel and a first transmission channel, and performs a data transfer by a direct memory access in accordance with a descriptor acquired from a first memory; a second channel which includes a second reception channel and a second transmission channel, and performs the data transfer by a direct memory access in accordance with a descriptor acquired from a second memory; and a mode setting register, the control method comprising:

selecting one channel between the first channel and the second channel in accordance with information set at the mode setting register by a channel switching part of the direct memory access controller; and detecting a boundary of a packet to be transferred, and performing a switching to the selected channel at the detected boundary of the packet by the channel switching part, wherein the channel switching part detects the boundary of the packet based on data size information acquired from a header of the packet to be transferred, the second channel transmits a data, received at the second reception channel while a switching of the channels is performed, from the second transmission channel after the switching of the channels is completed when a switching from the second channel to the first channel is performed, the channel switching part includes a transferring part which transfers the data, transmitted from the second transmission channel after the switching of the channels is completed, to the first reception channel when the switching from the second channel to the first channel is performed, and the channel switching part executes, by one packet unit, the selecting one channel, the detecting the boundary of the packet, and the performing the switching to the selected channel.

6. An information processing system, comprising:

a first CPU and a first memory;

a second CPU and a second memory which are respectively different from the first CPU and the first memory; and a direct memory access controller, wherein the direct memory access controller includes:

a first channel which includes a first reception channel and a first transmission channel, and performs a data transfer by a direct memory access in accordance with a descriptor acquired from the first memory;

a second channel which includes a second reception channel and a second transmission channel, and performs the data transfer by a direct memory access in accordance with a descriptor acquired from the second memory;

a mode setting register in which information indicating whether or not the first CPU and the first memory are stopped is set; and a channel switching part which selects one channel between the first channel and the second channel in accordance with the information set at the mode setting register, detects a boundary of a packet to be transferred, and performs a switching to the selected channel at the detected boundary of the packet, by one packet unit, wherein the channel switching part detects the boundary of the packet based on data size information acquired from a header of the packet to be transferred, the second channel transmits a data, received at the second reception channel while a switching of the channels is performed, from the second transmission channel after the switching of the channels is completed when a switching from the second channel to the first channel is performed, and the channel switching part includes a transferring part which transfers the data, transmitted from the second transmission channel after the switching of the channels is completed, to the first reception channel when the switching from the second channel to the first channel is performed.

7. The information processing system according to claim 6,
wherein when a switching from the first channel to the second channel is performed in accordance with the information set at the mode setting register, electricity to the first CPU and the first memory is turned off after the switching to the second channel.

\* \* \* \* \*